US007673042B2

(12) United States Patent
Lesser

(10) Patent No.: US 7,673,042 B2
(45) Date of Patent: Mar. 2, 2010

(54) SYSTEM AND METHOD FOR COMPARING SERVICE LEVELS TO A SERVICE LEVEL OBJECTIVE

(75) Inventor: Amichai Lesser, Hoboken, NJ (US)

(73) Assignee: Shunra Software, Ltd., Kfar Saba (IL)

( * ) Notice: Subject to any disclaimer, the term of this patent is extended or adjusted under 35 U.S.C. 154(b) by 1032 days.

(21) Appl. No.: 11/294,597

(22) Filed: Dec. 6, 2005

(65) Prior Publication Data
US 2007/0130325 A1    Jun. 7, 2007

(51) Int. Cl.
G06F 15/16    (2006.01)
G06F 12/00    (2006.01)
(52) U.S. Cl. ...................... 709/224; 709/229
(58) Field of Classification Search ......... 709/223–229, 709/217–218, 250
See application file for complete search history.

(56) References Cited

U.S. PATENT DOCUMENTS

| 5,893,905 | A  | * | 4/1999  | Main et al. ............... 705/11 |
| 6,725,399 | B1 |   | 4/2004  | Bowman |
| 6,748,433 | B1 | * | 6/2004  | Yaakov ................... 709/224 |
| 7,173,910 | B2 | * | 2/2007  | Goodman ................. 370/252 |
| 7,299,284 | B2 | * | 11/2007 | McKinnon et al. .......... 709/225 |
| 2003/0229695 | A1 |   | 12/2003 | McBride |
| 2005/0080893 | A1 | * | 4/2005  | Castellanos et al. ........ 709/224 |
| 2005/0222885 | A1 | * | 10/2005 | Chen et al. .................. 705/8 |
| 2006/0085544 | A1 | * | 4/2006  | Chen et al. ............... 709/226 |
| 2007/0130306 | A1 |   | 6/2007  | Ofel |

OTHER PUBLICATIONS

IT Guru Opnet 2004 OPNET Technologies Inc www.opnet.com.
Precise accurate performance analysis; Compuware Application Vantage—Aug. 2005 COMPUWARE www.compuware.com.
End-to-end application service management COMPUWARE www.compuware.com.
IPS Capacity Manager Production Sytems Capacity Management Hy Perform ix 2005 HyPerform, Inc www.hyperformix.com.
IPS Performance Designer Hy Perform ix 2005 HyPerform Inc. www.hyperformix.com.
IPS Performance Optimizer Hy Perform ix 2005 HyPerform Inc www.hyperformix.com.
Control application growth with confidence Compuware Corporation www.compuware.com.
Non-final Office Action for U.S. Appl. No. 09/600,141 mailed Feb. 26, 2004.
Non-final Office Action for U.S. Appl. No. 11/294,614 mailed Jan. 12, 2009.
Non-final Office Action for U.S. Appl. No. 11/339,831 mailed Feb. 5, 2009.
Non-final Office Action for U.S. Appl. No. 11/724,229 mailed May 15, 2009.
Non-final Office Action for U.S. Appl. No. 11/724,295 mailed Feb. 2, 2009.
Non-final Office Action for U.S. Appl. No. 11/723,575 mailed May 28, 2009.

* cited by examiner

Primary Examiner—Zarni Maung
(74) Attorney, Agent, or Firm—Pearl Cohen Zedek Latzer, LLP

(57) ABSTRACT

A system and method of producing network conditions on a link between points of a network; changing a condition of the produced network conditions; recording a service level or other metric achieved by a transaction of an application under the change in network conditions; and comparing the recorded service level or metric to a pre-defined service level objective.

19 Claims, 2 Drawing Sheets

US 7,673,042 B2

SYSTEM AND METHOD FOR COMPARING SERVICE LEVELS TO A SERVICE LEVEL OBJECTIVE

FIELD OF THE INVENTION

The present invention relates to computer networks. More particularly, the present invention relates to a system and method for evaluating service levels in the execution of transactions over a network.

BACKGROUND OF THE INVENTION

Network application and resource planning may measure a network's ability to serve users at an acceptable speed and with acceptable transaction success rates. The process may involve measuring the computing resources that may be necessary to support a particular number of users of a particular application. Among the constraints or conditions that may effect the performance of a network are bandwidth, latency, bandwidth utilization, packet loss rate, jitter rate, filtering, route changes, queuing, load balancing, packet modification, Quality of Service mechanisms, multi protocol label switching (MPLS), virtual LAN (VLAN), out-of-order packets, packet duplication, packet fragmentation, time to live (TTL) effects, link faults such as bit errors and disconnections, congestion and others.

Factors that may be considered for evaluating a performance of an application on a network may include a transaction response time (TRT) that a user may encounter when for example requesting a transfer of data from a server or the updating of data to a remote data base. A maximum permissible range for a TRT may be known as a service level objective (SLO). Other factors may be considered, and other measures of a performance of, for example a transaction of an application on a network, may be evaluated. One or more of such other factors may be assigned an SLO in evaluating the performance of a transaction over a network.

Prior network capacity systems, either analytical and/or discreet event simulation tools, model network conditions or constraints and may execute transactions of an application on such models. Modeling network constraints, characteristics or conditions is subject to inaccuracies and inconsistencies, and is heavily dependent on the integrity of the model being used.

SUMMARY OF THE INVENTION

In embodiments of the invention, a system and method are provided to store an SLO, produce network conditions in a link or path between two or more network points such as for example clients, servers or memory units, change a condition of the produced network conditions to reflect for example changes in bandwidth, latency, packet loss, bandwidth utilization or other network constraints, record a service level of a transaction of an application under the changed conditions on the link or path, and compare the recorded service level with the stored SLO.

Measures or comparisons of SLOs to actual service levels on the produced network conditions may be calculated for a number of users of the application, for various complexity of transactions initiated by such users, for different scenarios or ramp-up of the number of users of the application and for other usage factors. In some embodiments, scripts or pre-planned scenarios of transactions of an application that may be run on the network under the varied conditions may be executed. Permutations of changes in some network conditions while keeping other conditions constant may be stored or run.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

DETAILED DESCRIPTION OF THE PREFERRED EMBODIMENTS

In the following description, various embodiments of the invention will be described. For purposes of explanation, specific examples are set forth in order to provide a thorough understanding of at least one embodiment of the invention. However, it will also be apparent to one skilled in the art that other embodiments of the invention are not limited to the examples described herein. Furthermore, well-known features may be omitted or simplified in order not to obscure embodiments of the invention described herein.

Unless specifically stated otherwise, as apparent from the following discussions, it is appreciated that throughout the specification, discussions utilizing terms such as "selecting," "processing," "computing," "calculating," "determining," or the like, refer to the actions and/or processes of a computer, computer processor or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The processes and functions presented herein are not inherently related to any particular computer, network or other apparatus Embodiments of the invention described herein are not described with reference to any particular programming language, machine code, etc. It will be appreciated that a variety of programming languages, network systems, protocols or hardware configurations may be used to implement the teachings of the embodiments of the invention as described herein.

Figure 1:
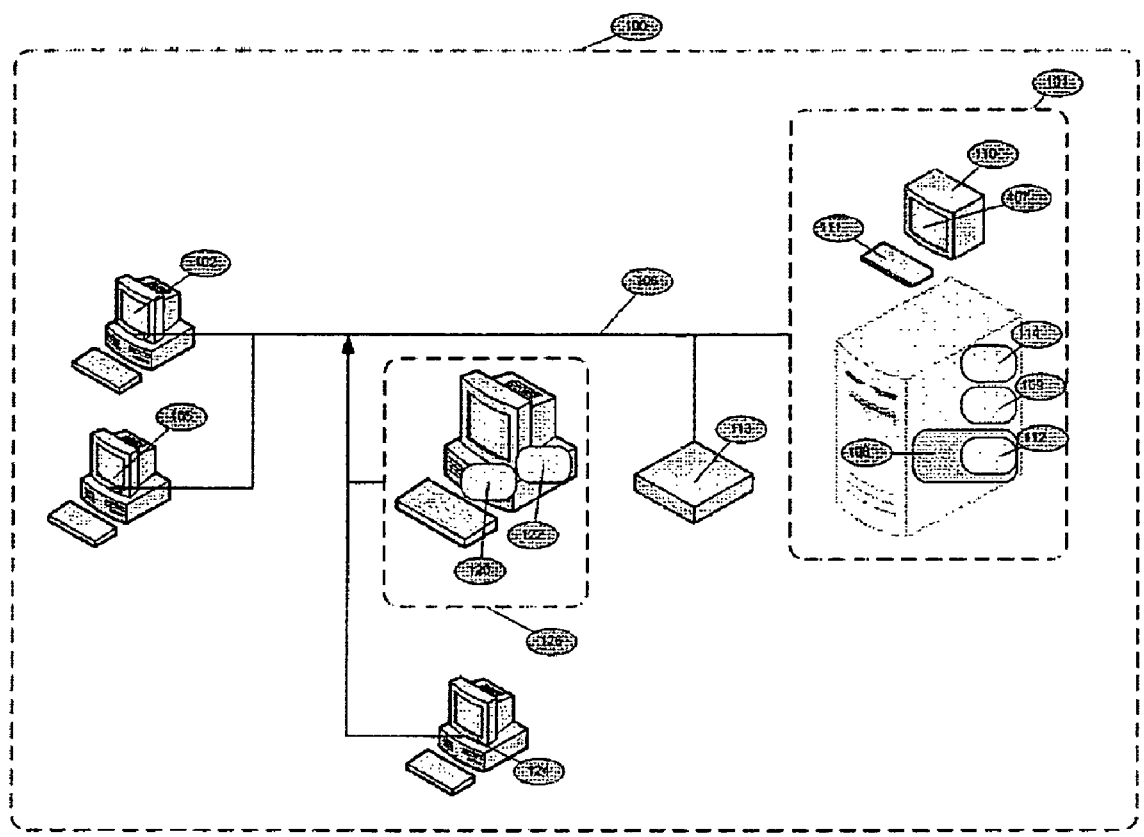
FIG. 1 is a conceptual illustration of components of a network, including a server connected to one or more workstations or clients and to a computing platform that may produce network conditions or impose network constraints, in accordance with a preferred embodiment of the present invention.

Reference is made to FIG. 1, a conceptual illustration of components of a network, including a server connected to one or more workstations or clients and to a computing platform that may produce network conditions or impose network constraints, in accordance with a preferred embodiment of the present invention.

In operation and in some embodiments, a computing platform 126 may include a memory 122 and a processor 120, and may produce network conditions along path 106 between for example client 102 and server 101. In some embodiments, path 106 may extend to or from other components or units in a network 100. Load tool 124 may initiate and execute one or more transactions of an application 112 between for example client 102 and server 101, and processor 120 may alter, vary or change one or more network conditions or constraints of the path 106 between for example client 102 and server 101 or for example other network points 105. A memory such as for example memory 122 may record performance metrics of the transactions of application 112 at each or some of the various network conditions imposed on path 106. One or more of such metrics may be calculated into for example a service level, and may be compared to a pre-defined SLO.

Network 100, otherwise called a computer network or an area network, may be implemented in many different shapes and sizes Examples of networks 100 may include, without limitation and in various combinations, a Local Area Network (LAN), a Wide Area Network (WAN), a Metropolitan Area Network (MAN) or others. Hence, the network 100 may have various number of servers 101 or multi-tiered serves that are electrically coupled to any number of workstations/clients 102 or points 105 over various types of communication path 106 over various distances.

Network descriptions, such as LAN, WAN, and MAN, may sometimes imply a physical distance that the network 100 spans or a distance-based concept. For example, a LAN may connect network devices over a relatively short distance. A WAN may span a large physical distance. WANs may use technology like leased lines, cable modems, Internet, asynchronous transfer mode (ATM), Frame Relay, E1, T1, and X 25 for connectivity. Other terms, designations and distances may be used.

Server 101 or computing platform 126 may include for example a user interface 107, a memory unit 108, and a processor 109. Memory unit 108 may include one or more software applications 112. User interface 107 may include for example an output device 110 an input device 111 and in some cases more devices.

Server 101 may be implemented as, without limitation, a computer, a workstation, a personal computer, a handheld computer, a desktop computer, a laptop computer, and the like. Server 101 may be mobile, fixed, or convertible between mobile and fixed, depending on a particular implementation. Server 101 may be a computer adapted for a fixed implementation. In some embodiments, server 101 and computing platform 126 may share one or more of a processor 109, data storage or memory unit 108, user interface 107, an output device 110, an input device 111 or other components. In some embodiments, computing platform 126 and server 101 may be contained in the same unit.

Processor 109, may be a central processing unit (CPU) or controller, that may control some or all functions of server 101. Processor 109 may execute, retrieve, transfer, and decode instructions over communication paths, internal or external to the server 101, and may retrieve, transport or store data to or from peripherals and components of server 101. The processor 109 may include or be connected to an interface to such elements that may be located outside the server 101, but communicating with the processor 109, such as via the communication path 106.

Memory unit 108 may include without limitation, a hard drive, read only memory (ROM), and random access memory (RAM) or other data storage units. Memory unit 108 may be of a suitable size to accommodate one or more applications 112 and other program and storage needs. Application 112, may be for example executable applications deployed over a WAN. Application 112 may take other forms and serve other or additional functions.

In the user interface 107, the input device 111 may permit a user to input information into the server 101 or computing platform 126. Output device 110 may permit a user to receive information from the server 101 or computing platform 126. Input device 111 may be a keyboard, but also may be a touch screen, a microphone with a voice recognition program, or other devices. Output device 110 may be or include for example a display, but also may be a speaker, for example or other output device. Output device 110 may provide information to the user responsive to the input device 111 receiving information from the user or may be responsive to other activity by the server 101 or computing platform 126. For example, the display may present information responsive to the user entering information in the server 101 or computing platform 126 via a keypad.

Server 101 or computing platform 126 may contain other elements, including, without limitation, a data input interface and a data output interface that may provide communication ports that permit data to be received by and sent from, respectively, server 101 or computing platform 126. The data input interface and the data output interface may be the same interface, permitting bidirectional communication, or may be different interfaces, permitting opposite, unidirectional communication. Examples of the data input interface and the data output interface include, without limitation, parallel ports, and serial ports, such as a universal serial bus (USB).

Client 102 may be implemented as, without limitation, a computer, a workstation, a personal computer, a handheld computer, a desktop computer, a laptop computer, communication device and the like. Client 102 may be mobile, fixed, or convertible between mobile and fixed, depending on the particular implementation. Client 102 may be adapted for a fixed implementation The communication path 106 may electrically or electronically couple the server 101 and/or computing platform 126 to one or more of clients 102. Communication path 106 may be or include wired and/or wireless components and may accommodate the fixed and/or mobile server 101 or clients 102, respectively Examples of wired communication paths include, without limitation, LANs, leased WAN circuits, ATM, flame relay. Examples of wireless communication paths include, without limitation, wireless LANs, microwave links, satellite.

Network 100 may also include an external data storage unit 113 for storing software applications 112 or other applications, data or instructions. Unit 113 may include, without limitation, one or more of the following: a hard drive, read only memory (ROM), and random access memory (RAM). Unit 113 may be of suitable size to accommodate application 112, and other program and storage needs. Unit 113 may in some embodiments be used in cooperation with or as a substitute for the memory unit 108 in the server 101.

Computer readable product 114, such as a computer readable storage medium, a disk (such as a compact disk (CD)), for example, or other portable storage medium containing an executable code may in some embodiments contain instructions that may perform a method in accordance with an embodiment of the invention.

Network condition processor 120 may be or include a processor separate from processor 109, or may be or include software that may run on or from processor 109 or from another processor. In some embodiments, network condition processor 120 may be included in a unit that is separate from server 101. In some embodiments, network condition processor 120 may include physical connections to and from server 101 and one or more of clients 102.

Network condition processor 120 may include or be connected to a memory 122 that may be part of or separate from memory unit 113. Network condition processor 120 may include instructions to for example impose a delay or latency in the transmission of packets or other data units that may be passed to or from server 101 to client 102 or to other units 105 that may be connected to network 100 and processor 120. In some embodiments, processor 120 may impose or produce bandwidth limitations or other constraints or interferences on network traffic to, from or between server 101, clients 102 or other points 105 of network 100. Processor 120 may also impose or produce network conditions or constraints such as bandwidth, latency, bandwidth utilization, packet loss rate, jitter rate, filtering, route changes, queuing, load balancing, packet modification, Quality of Service mechanisms, multi protocol label switching (MPLS), virtual LAN (VLAN), out-of-order packets, packet duplication, packet fragmentation, time to live (TTL) effects, link faults such as bit errors and disconnections, congestion and other network conditions that may be experienced of effect data transfers over a network 100, such as between server 101 and a client 102.

In some embodiments, processor 120 may alter or change one or more network conditions that it produces so that various permutations of network conditions are altered or kept unchanged, and so that some or all of the combinations of network conditions are be tested. For example, processor 120 may increase jitter on a network connection while holding packet loss and other conditions constant or unchanged. Similarly, processor 120 may alter or vary two or more network conditions that it produces while keeping other conditions constant. In some embodiments, processor 120 and for example memory 122 may record data, such as for example metrics of performance of a transaction over a network between for example server 101 and client 102. In some embodiments, a performance metric may be compared to a level of service objective for such metric In some embodiments, server 101 and client 102 may be connected to processor 120, and may be removed from some or all of the connection to network 100 or to parts of network 100, during for example a test of adherence to an SLO of one or more transactions of an application 112 between for example server 101 and client 102. For example, in some embodiments, processor 120 may produce network conditions similar to or essentially equivalent to those encountered by a client 102 when such client 102 executes a transaction of an application 112 with for example server 101 or with another client 102. In some embodiments, processor 120 or a recording or memory device may monitor or record network conditions such as jitter, packet loss or bandwidth utilizations on network 100, and produce such conditions in a path 106 between or among processor 120, server 101 and client 102.

In some embodiments, a script or order or a list of transactions of an application to be executed may be stored on and executed from for example a load tool 124. A load tool may be or include for example a Mercury™ LoadRunner™ or Segue™ SilkPerforme™. Other load tools 124 may be used. A load tool 124 may be run for example from a set of instructions such as a software application or from other platforms. The load tool 124 can also run from multiple computers.

In some embodiments, processor 120 may be or include one or more processors such as those available in a VE Network Appliance™ available from Shunta Software Ltd.™ of Kfar Sava, Israel. Other products or processors may be used as processor 120.

In some embodiments, a load tool 124 or some other memory and/or processing device may initiate one more transactions of one or more applications 112 from or between server 101 and one or more clients 102 or for example virtual clients or other network points 105 In some embodiments, load tool 124 may increase a number, frequency, size, complexity or other characteristics of transactions between for example server 101 and client 102, and/or may increase/decrease a number of users, a frequency of log-ons by users, a ramp-up time between log-ons by clients 102 or other permutations of users and transactions of an application 112 between or among clients 102, servers 101 or other points 105 of network 100.

In some embodiments, concurrently with, or at some other period when, for example load tool 124 is running, initiating, executing or processing transactions of application 112 between or among for example client 102, server 101 or other network components, processor 120 may produce, alter or vary one or more network conditions on a path 106 between for example client 102 and server 101. In some embodiments, all or some of the transactions initiated by for example load tool 124 may be initiated under one or more network conditions that may be produced by processor 120. In some embodiments, a memory such as unit 113 or another data storage unit may store performance metrics of transactions that are executed while network conditions are varied. In some embodiments, the transactions initiated by for example load tool 124 may be coordinated with the variations or changes in for example network conditions that are produced by for example processor 120, so that for example, one or more of a particular series of transactions is executed for each of the desired network conditions that is applied to a path 106 or network link by for example processor 120.

In some embodiments, a rating or evaluation of one or more transactions of an application 112 may include a TRT of a transaction, and a comparison of the TRT to an SLO. In some embodiments such rating or comparison may be expressed as for example a pass/fail of the execution of such transaction within the limits of the SLO Other criteria that may be evaluated may include a general success late or completion of requested transactions of an application over network 100, also know as availability, the percentage of transactions that meet an objective, also known as performance, and a diversity rate, or for example a standard deviation of successful responses from an objective, also known as consistency. Other factors may be considered.

Performance, availability, and consistency, may in some embodiments be expressed on calculated as follows:

$$Performance = 100 * \frac{\sum tps\_passed\_SLO}{\sum tps\_passed + \sum tps\_failed}$$

$$Availability = 100 * \frac{\sum tps\_passed}{\sum tps\_passed + \sum tps\_failed}$$

$$Consistency =$$

$$AverageResponseTime := \frac{\sum (tps\_passed * response\_time)}{\sum tps\_passed}$$

$$\left(1 - \frac{\sqrt{\sum (response\_time - AverageResponseTime)^2 * tps\_passed}}{\frac{\sum tps\_passed}{AverageResonseTime}}\right) * 100$$

Other criteria, evaluations and calculations are possible.

The measures of one or more of availability, performance and consistency may be classified in ranges, such that for example, a performance rate of between 0-55% may be unacceptable, while performance of between 56% and 100% may be acceptable. Using such classifications may enable a user to easily appreciate the results of testing in light of acceptability criteria that may have for example been pre-defined. Further classification of test results may let a user gauge for example more than one criterion at a time. For example, a test of a transaction of an application 112 under various produced network conditions may have yielded a 60% performance rate, which rate may be generally acceptable, but a 78% consistency rate. The 78% consistency rate may downgrade the otherwise acceptable performance rate to a not-acceptable result. Other combinations of criteria and classifications, with other designations are possible.

In some embodiments, a processor may, when determining a compliance of a transaction of an application 112 to a service level under a particular set of network communication constraints, assign a weight, relative importance or value to one or more particular transactions. For example, a transaction of an application 112 that fails to meet an SLO when for example all clients 102 are executing a transaction simultaneously, may be given less weight in determining compliance with an SLO than a transaction of an application that fails to meet an SLO when for example a typical number of clients are executing typical transactions under typical network conditions.

Figure 2:
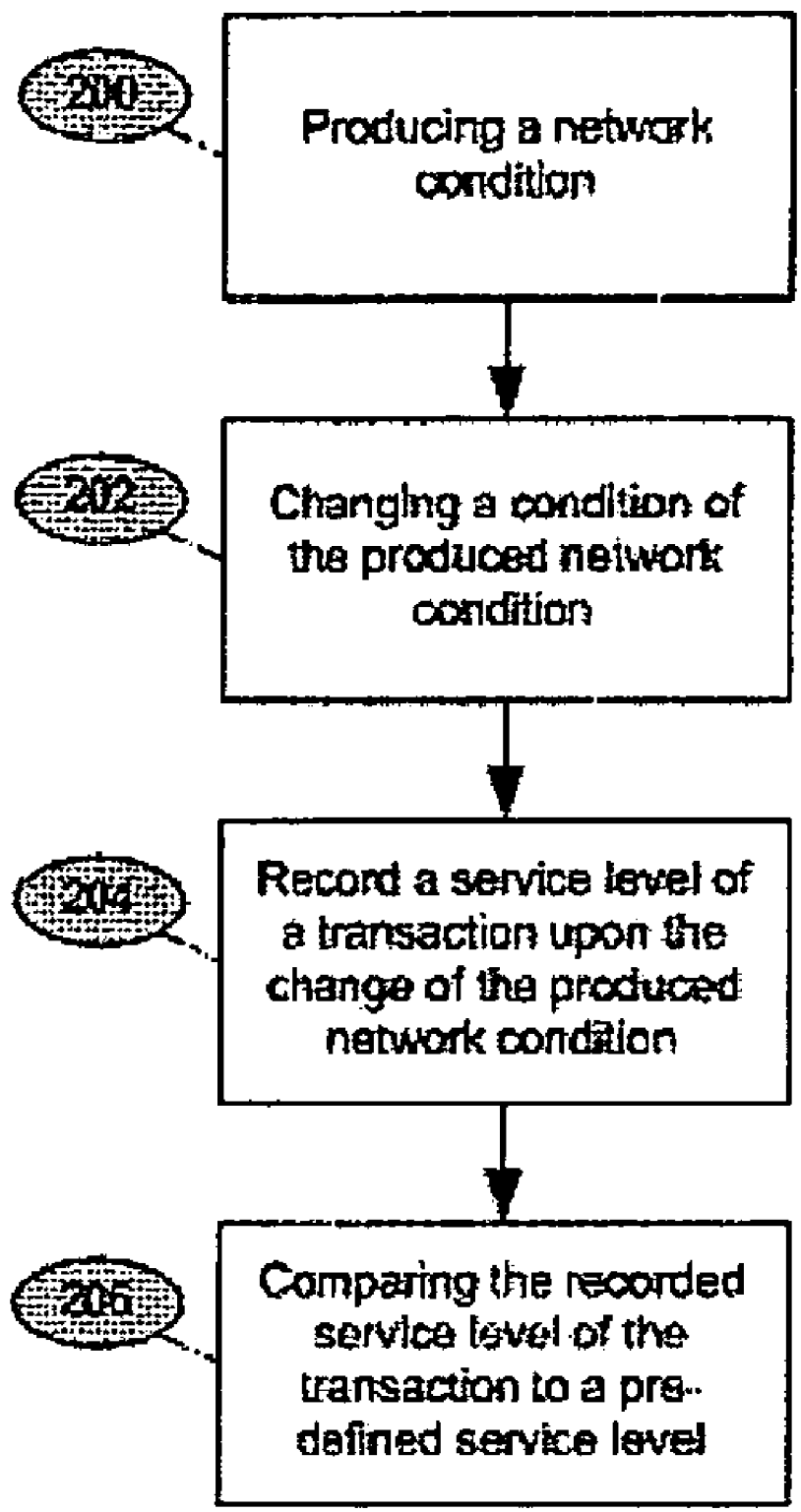
FIG. 2 is a flow diagram for evaluating a service level of one or more transactions of an application operating in a network, in accordance with a preferred embodiment of the present invention.

Reference is made to FIG. 2, a flow diagram of a method in accordance with a preferred embodiment of the present invention. In block 200, there may be produced by for example a processor, by a series of instructions that may be executed by a processor, or by other means, network communication conditions in for example a link between two or more points or devices of a communications or computer network. In some embodiments, such produced conditions may include conditions imposed by for example constraints on a bandwidth of a link between points on the network, by a bandwidth utilization of such link, by a packet loss rate of a link on such network, by a latency rate of one or more links of a network, or by other conditions.

In block 202, a processor or other component may change one or more of the produced network conditions. For example, a processor may alter, change or vary the bandwidth limitation of a link between two points on a network such as for example a server and a client, while for example keeping other variables or conditions of the network communication link unchanged. In some embodiments, a processor or other, component or instruction may alter two or more conditions such as for example latency rate and packet loss late, while keeping other conditions unchanged.

In block 204, a device such as a memory device may store the results of an evaluation of one or more criteria or metrics collected upon the execution of for example one or more transactions of an application on the network whose conditions were changed as in block 202. Such metrics may include for example an average performance rate, availability rate or consistency rate of transactions of an application, as such transactions were performed in the presence of particular network constraints. In some embodiments, a script or pre-defined combination or series of transactions may be initiated or performed on a network or link in a network for each or some of the possible constraints or changes in network.

In block 206, a processor may calculate one or more performance metrics for the one or more transactions initiated on a path, at the various constraints or conditions imposed on the path 106 or link. Such metrics or calculations may be for example stored in a memory, and/or compared to a stored or pre-defined SLO For example, a network operator or other user, may have defined an SLO of for example a 70% performance rate with an 80% consistency rate for of a series of transactions on an application under a given set of network constraints A user or operator may alter, vary or change for example a bandwidth rate, then run the same or a similar series of transactions, and collect the same or similar set of metrics. This process may be repeated for different combinations of constraints or network conditions are imposed. A processor or a user or operator may determine for example at what levels of network conditions a service level for a transaction or series of transactions will fail to reach a pre-defined SLO.

In some embodiments, multiple or varying numbers of clients or virtual clients may initiate or execute a transaction of an application at a particular time, of may log-on and join a network over a pre-defined or random periods at pre-defined or random intervals.

In some embodiments, a software tool, such as Mercury LoadRunner or Segue SilkPerformer tool may capture performance metrics when for example a client executes particular functions of an application. In some embodiments, one or more clients, servers or points of a network may be linked into a test LAN that may include a processor to produce network conditions. Such LAN may in some embodiments not be connected to other components of a network while metrics of the application are being collected.

It will be appreciated by persons skilled in the art that embodiments of the invention are not limited by what has been particularly shown and described hereinabove. Rather the scope of at least one embodiment of the invention is defined by the claims below.

I claim:

1. A system comprising:
   a memory to store a service level objective; and
   a processor to:
   impose an interference on network traffic between points on a network;
   change a condition of said imposed interference;
   record a service level of a transaction of an application under said change in said imposed interference; and
   compare said recorded service level to said service level objective.

2. The system as in claim 1, wherein said processor to change a condition of said imposed interference, comprises a processor to change an interference selected from the group consisting of latency, bandwidth utilization, packet loss rate, jitter rate, filtering, route changes, queuing, load balancing, packet modification, Quality of Service mechanisms, multi protocol label switching, out-of-order packets, packet duplication, packet fragmentation, time to live effects, bit errors, disconnections, and congestion.

3. The system as in claim 1, wherein said processor is to produce interferences equivalent to conditions on said network when a plurality of clients use said application on said network.

4. The system as in claim 1, wherein said memory comprises a memory to store a list of said changes in said imposed interference.

5. The system as in claim 1, wherein said memory comprises a memory to store a script of at least one of said transactions of said application.

6. The system as in claim 1, wherein said processor is to produce a change in a plurality of imposed interferences.

7. A method comprising:
   imposing an interference on a path of a network;
   changing the imposed interference;
   recording a service level of a transaction of an application upon said changing in said imposed interference; and
   comparing said service level to a pre-defined service level.

8. The method as in claim 7, wherein said changing comprises changing an imposed interference selected from the group consisting of latency, packet loss rate, jitter rate, filtering, route changes, queuing, load balancing, packet modification, Quality of Service mechanisms, multi protocol label switching, out-of-order packets, packet duplication, packet fragmentation, time to live effects, bit errors, disconnections, and congestion.

9. The method as in claim 7, wherein said imposing said interference comprises producing network conditions equivalent to conditions on said network when a plurality of clients use said application on said network.

10. The method as in claim 7, comprising executing concurrently a plurality of said transactions of said application from a plurality of clients on said network.

11. The method as in claim 7, comprising executing a plurality of transactions from a script of said transactions of said application.

12. The method as in claim 7, wherein said interference comprises a plurality of interferences, and said changing comprises changing a first interference while keeping unchanged a second interference.

13. The method as in claim 7, wherein said recording a service level of a transaction of an application upon said changing in said interference, comprises assigning an importance value to said transaction.

14. An article comprising a machine accessible medium having stored thereon instructions that when executed result in:

producing an interference between points of a network;

changing said interference;

recording a service level of a transaction of an application upon said changing said interference; and comparing said service level to a pre-defined service level.

15. The article as in claim 14, wherein said execution of said instructions further results in executing concurrently a plurality of said transactions of said application from a plurality of clients on said network.

16. The article as in claim 14, wherein said execution of said instructions further results in executing a plurality of transactions from a script of said transactions of said application.

17. The article as in claim 14, wherein said changing comprises changing a condition of an interference selected from the group consisting of latency, bandwidth utilization, packet loss rate, jitter rate, filtering, route changes, queuing, load balancing, packet modification, Quality of Service mechanisms, multi protocol label switching, out-of-order packets, packet duplication, packet fragmentation, time to live effects, bit errors, disconnections, congestion.

18. The article as in claim 14, wherein said producing said interference comprises producing network conditions equivalent to conditions on said network when a plurality of clients use said application on said network.

19. The article as in claim 14, wherein said interference comprises a plurality of interferences, and said changing comprises changing a first of said plurality of interferences while keeping unchanged a second of said plurality of interferences.

* * * * *